No. 831,640. PATENTED SEPT. 25, 1906.
R. A. B. WALSH.
WIRED GLASS.
APPLICATION FILED AUG. 16, 1905.
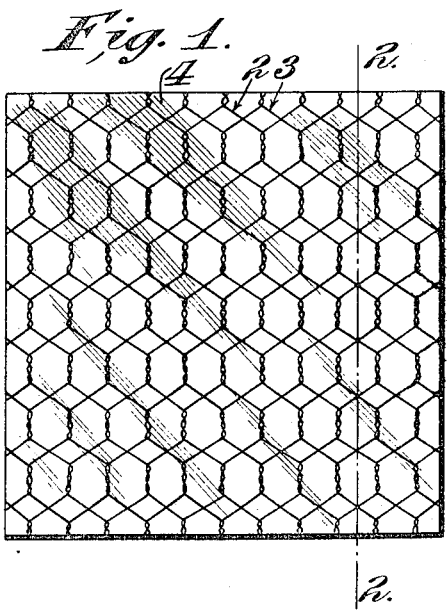
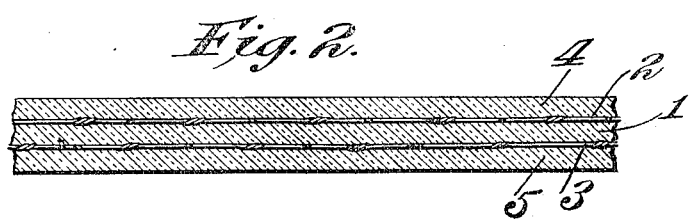
Witnesses:
G. A. Pennington
O. F. Funk
Inventor:
Robert A. B. Walsh,
by Bakewell & Cornwall
Attys.

UNITED STATES PATENT OFFICE.

ROBERT A. B. WALSH, OF ST. LOUIS, MISSOURI, ASSIGNOR TO MISSISSIPPI GLASS COMPANY, OF ST. LOUIS, MISSOURI, A CORPORATION OF MISSOURI.

WIRED GLASS.

No. 831,640.   Specification of Letters Patent.   Patented Sept. 25, 1906.

Application filed August 16, 1905. Serial No. 274,463.

*To all whom it may concern:*

Be it known that I, ROBERT A. B. WALSH, a citizen of the United States, residing at the city of St. Louis, State of Missouri, have invented a certain new and useful Improvement in Wired Glass, of which the following is a full, clear, and exact description, such as will enable others skilled in the art to which it appertains to make and use the same, reference being had to the accompanying drawings, forming part of this specification, in which—

Figure 1 is a plan view of a glass sheet constructed in accordance with my invention, and Fig. 2 is a cross-sectional view through the glass sheet.

This invention relates to wired glass; and one of the objects thereof is to provide a sheet or plate of glass having embedded therein a plurality of wire meshes or fabrics which are so arranged as to better strengthen the glass sheet and protect the opening covered thereby in case of fire.

Heretofore wired glass sheets have generally been provided with a single mesh, and in the event of excessive heat being applied to the glass sheet, with the resulting cracking of the glass, the tendency of the glass to fall away from the mesh has been a serious disadvantage.

It is the purpose of my invention to so arrange the mesh that a continuous thick layer of glass will be interposed between two approximately flat parallel wire meshes which are covered by layers of glass having approximately smooth outer faces, said wire meshes being entirely embedded within the glass, so that in the event of excessive heat being applied—as, for example, in the case of fire and in the event that the two outer layers of glass should break away from the meshes from any cause—the interposed layer or layers of glass will be held between the wire meshes, said interposed layer being continuous and comparatively thick, so that the door or opening in which the glass is placed will practically be covered.

Referring now to the drawings by numerals of reference, the sheet of glass is illustrated as consisting of a continuous inner or intermediate layer of glass 1, separating a plurality of wire fabrics 2 and 3. In the present instance there are two shown; but a greater number may be employed, if desired. These two fabrics are embedded in the sheet, so as to be covered by the outer layers 4 and 5. In actual practice the fabrics will be arranged in staggered relation to each other—that is to say, the meshes of one fabric will overlap those of the other fabric. By so arranging the meshes of the fabrics with respect to each other practically the entire body of the glass will be reinforced by the wire, so as to make the glass much stronger than the ordinary wired glass, and inasmuch as the wire fabrics act as binders or bonds the liability of the glass becoming cracked so as to seriously expose the premises having an opening covered by said glass will be avoided.

Having thus described my invention, what I claim, and desire to secure by Letters Patent, is—

A sheet of glass having embedded therein a plurality of layers of wire fabric arranged parallel to the outer faces of the sheet and with their meshes overlapping each other, said layers of fabric being spaced away from each other and also from the outer faces of the glass sheet whereby a continuous layer of glass of uniform thickness is interposed between the layers of wire fabric; substantially as described.

In testimony whereof I hereunto affix my signature, in the presence of two witnesses, this 14th day of August, 1905.

ROBERT A. B. WALSH.

Witnesses:
  B. F. FENCH,
  GEORGE BAKEWELL.